(12) United States Patent
Park et al.

(10) Patent No.: US 11,343,359 B2
(45) Date of Patent: May 24, 2022

(54) DATA TRANSMISSION AND RECEPTION METHOD IN VEHICLE NETWORK, AND APPARATUS FOR THE SAME

(71) Applicants: Hyundai Motor Company, Seoul (KR); Kia Motors Corporation, Seoul (KR); Industry-University Cooperation Foundation Hanyang University, Seoul (KR)

(72) Inventors: Sung Kwon Park, Seoul (KR); Tae Hyung Kim, Seoul (KR)

(73) Assignees: Hyundai Motor Company, Seoul (KR); Kia Motors Corporation, Seoul (KR); Industry-University Cooperation Foundation Hanyang University, Seoul (KR)

( * ) Notice: Subject to any disclaimer, the term of this patent is extended or adjusted under 35 U.S.C. 154(b) by 64 days.

(21) Appl. No.: 16/807,861

(22) Filed: Mar. 3, 2020

(65) Prior Publication Data

US 2020/0287995 A1    Sep. 10, 2020

(30) Foreign Application Priority Data

Mar. 4, 2019 (KR) .................. 10-2019-0024685
Feb. 25, 2020 (KR) .................. 10-2020-0022767

(51) Int. Cl.
*H04L 69/22* (2022.01)
*H04L 69/324* (2022.01)
*H04L 67/12* (2022.01)

(52) U.S. Cl.
CPC .............. *H04L 69/22* (2013.01); *H04L 67/12* (2013.01); *H04L 69/324* (2013.01)

(58) Field of Classification Search
CPC ...................................................... H04L 69/22
See application file for complete search history.

(56) References Cited

U.S. PATENT DOCUMENTS

| | | | | |
|---|---|---|---|---|
| 5,956,338 | A * | 9/1999 | Ghaibeh | H04L 12/2801 370/236.2 |
| 6,993,042 | B1 * | 1/2006 | Akatsuka | H04L 12/4035 370/230 |
| 2009/0282277 | A1 * | 11/2009 | Sedarat | G06F 1/3209 713/320 |
| 2013/0054995 | A1 * | 2/2013 | Dove | H04L 12/40032 713/323 |
| 2015/0071303 | A1 * | 3/2015 | Tajima | H04J 14/0267 370/433 |
| 2015/0143144 | A1 * | 5/2015 | Balbierer | H04L 12/40039 713/320 |
| 2021/0105160 | A1 * | 4/2021 | Lo | H04B 3/20 |

* cited by examiner

*Primary Examiner* — Jason E Mattis
(74) *Attorney, Agent, or Firm* — Mintz Levin Cohn Ferris Glovsky and Popeo, P.C.; Peter F. Corless

(57) ABSTRACT

An operation method of a first communication node in an Ethernet-based vehicle network is provided. A frame n is generated including a data unit n, and a first indicator indicating that a size of a data unit n+1 to be transmitted via a frame n+1 after determining that the frame n is different from a size of the data unit n. The frame n is transmitted to a second communication node and the frame n+1 is generated including the data unit n+1. The frame n+1 is then transmitted to the second communication node. The transmission rate of the data unit n is different from the transmission rate of the data unit n+1, and n is a natural number.

10 Claims, 16 Drawing Sheets

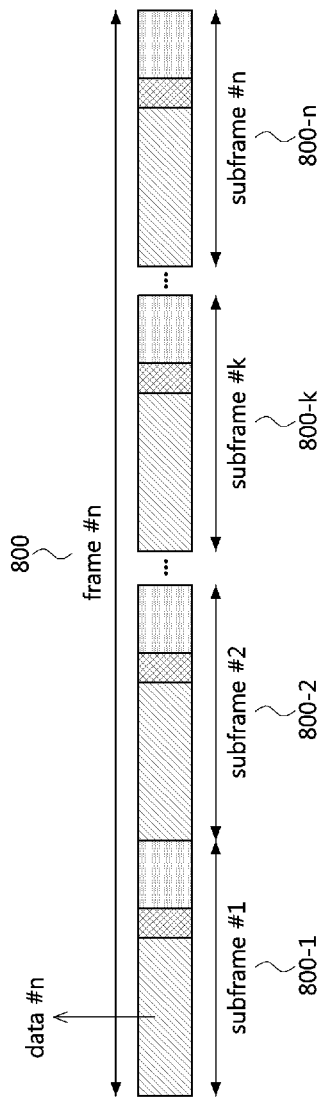

FIG. 11

| | first indicator (821) | | second indicator (823) | | | | | | | |
|---|---|---|---|---|---|---|---|---|---|---|
| | D9 | D8 | D7 | D6 | D5 | D4 | D3 | D2 | D1 | D0 |
| symbol 0 | reserved | 0 | reserved | reserved | reserved | reserved | PingRx | PingTx | SNR<1> | SNR<0> |
| symbol 1 | reserved | 1 | Valid | Toggle | Ack | TogAck | Message_Number<3:0> | | | |
| symbol 2 | reserved | 1 | message<0><7:0> | | | | | | | |
| symbol 3 | reserved | 1 | message<1><7:0> | | | | | | | |
| symbol 4 | reserved | 1 | message<2><7:0> | | | | | | | |
| symbol 5 | reserved | 1 | message<3><7:0> | | | | | | | |
| symbol 6 | reserved | 1 | message<4><7:0> | | | | | | | |
| symbol 7 | reserved | 1 | message<5><7:0> | | | | | | | |
| symbol 8 | reserved | 1 | message<6><7:0> | | | | | | | |
| symbol 9 | reserved | 1 | message<7><7:0> | | | | | | | |
| symbol 10 | reserved | 1 | message<8><7:0> | | | | | | | |
| symbol 11 | reserved | 1 | message<9><7:0> | | | | | | | |
| symbol 12 | reserved | 1 | message<10><7:0> | | | | | | | |
| symbol 13 | reserved | 1 | message<11><7:0> | | | | | | | |
| symbol 14 | RS(16,14) parity | | | | | | | | | |
| symbol 15 | RS(16,14) parity | | | | | | | | | |

| Control character | Notation | XGMII control codes | 2.5G/5G/10G BASE-T1 control codes | 2.5G/5G/10G BASE-T1 O code |
|---|---|---|---|---|
| idle | /I/ | 0x07 | 0x00 | |
| LPI | /LI/ | 0x06 | 0x06 | |
| start | /S/ | 0xFB | Encoded by block type field | |
| terminate | /T/ | 0xFD | Encoded by block type field | |
| error | /E/ | 0xFE | 0x1E | |
| Sequence ordered set | /Q/ | 0x9C | Encoded by block type field plus O code | 0x0 |
| Asymmetric operation | /A/ | 0x1C | 0x2D | reserved0 |

1810  1820

DATA TRANSMISSION AND RECEPTION METHOD IN VEHICLE NETWORK, AND APPARATUS FOR THE SAME

CROSS-REFERENCE TO RELATED APPLICATION

This application claims the benefit of priority to KR Patent Application No. 10-2019-0024685, filed on Mar. 4, 2019, and KR Patent Application No. 10-2020-0022767, filed on Feb. 25, 2020, the entirety of which is incorporated by reference as if fully set forth herein.

FIELD OF THE DISCLOSURE

The present disclosure relates to a technology for communications in a vehicle network, and more specifically, to a method of transmitting and receiving data in a vehicle network including an Ethernet-based network and an apparatus for the same.

BACKGROUND

The number and variety of devices installed within vehicles have increased significantly in accordance with the recent digitalization of vehicle parts. Generally, electronic devices may be used throughout the vehicles, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth may be used.

The electronic devices used in each of the above-referenced systems are connected via a vehicle network. The vehicle network supports functions of the electronic devices. For instance, the CAN may support a transmission rate of up to about 1 Mbps and support automatic retransmission of colliding messages, error detection based on a cycle redundancy interface (CRC), or the like. The FlexRay-based network may support a transmission rate of up to about 10 Mbps and support simultaneous transmission of data via two channels, synchronous data transmission, or the like. The MOST-based network is a communication network for high-quality multimedia. The MOST-based network may support a transmission rate of up to about 150 Mbps.

Many enhanced safety systems of a vehicle, such as telematics systems and infotainment systems, require higher transmission rates and system expandability. However, the CAN, FlexRay-based network, and the like may not sufficiently support the higher transmission rates and system expandability. The MOST-based network, in particular, may support a higher transmission rate than the CAN or the FlexRay-based network. However, applying the MOST-based network to vehicle networks may be costly. Due to these limitations, an Ethernet-based network is often utilized as a vehicle network. The Ethernet-based network may support bi-directional communication via one pair of windings and may support a transmission rate of up to about 10 Gbps.

Additionally, in a vehicle network, data transmitted and received between end nodes may have a significant difference in data size based on the type of information. For example, audio or video data for a camera or a display, and control data may have a large difference in data size. Therefore, when end nodes transmit and receive data at the same rate regardless of data size, efficiency may be reduced in terms of energy saving.

In order to solve the problem of reduced efficiency, a method of utilizing a low power idle (LPI) supporting Energy Efficient Ethernet (EEE) has been developed. In other words, for the EEE, an end node transmits data by entering an LPI mode, thereby saving energy. Specifically, the end node transmits data to be transmitted in the LPI mode at regular intervals. When the end node transmits data at regular intervals, the data transmission rate (e.g., bits per second (bps)) is reduced, resulting in a difference in transmission rate compared to the case of transmitting data by maximally using the link. Thus, energy consumption may be reduced.

However, there are problems with the method of utilizing the LPI for supporting the EEE. For instance, when the end node enters the LPI mode, an idle mode may be configured to prevent loss or corruption of a frame. In particular, a time delay may occur. Additionally, data is transmitted at a fixed rate without considering data size. Therefore, energy is not efficiently used for transmission of data having a relatively small size.

SUMMARY

The present disclosure provides a method and an apparatus for an end node to transmit data based on a size of the end node. In accordance with an exemplary embodiment of the present disclosure, an operation method of a first communication node in an Ethernet-based vehicle network may include generating a frame n including a data unit n, and a first indicator indicating that a size of a data unit n+1 to be transmitted via a frame n+1 after determining that the frame n is different from a size of the data unit n. Additionally, the operation method may include transmitting the frame n to a second communication node Further, the operation may include generating the frame n+1 including the data unit n+1 Still further, the operation method may include transmitting the frame n+1 to the second communication node. The transmission rate of the data unit n may be different from the transmission rate of the data unit n+1, and n may be a natural number.

The frame n may include a second indicator indicating a transmission rate of the data unit n+1. The first communication node may be configured to transmit the frame n+1 to the second communication node at a transmission rate indicated by the second indicator. The frame n may include a plurality of subframes. The first indicator and the second indicator may be included in a last subframe among the plurality of subframes. The last subframe may include a data field and an operation/administration/maintenance (OAM) field. The first indicator and the second indicator may be included in the OAM field. The frame n+1 may include a plurality of subframes. The frame n+1 may include one or more quiet time durations (QTDs). During QTDs, data transmission may be interrupted. The QTDs may be inserted with the plurality of subframes. The length of the QTD may be identical to the length of one subframe of the plurality of subframes. The same number of the QTDs may be configured for each of the plurality of subframes. The transmission rate of the data unit n+1 may be determined based on the number of the QTDs.

In accordance with another exemplary embodiment of the present disclosure, an operation method of a first communication node in an Ethernet-based vehicle network may include receiving a frame n from a second communication node, the frame n including a data unit n, and a first indicator indicating that a size of a data unit n+1 to be transmitted via a frame n+1 after determining that the frame n is different from a size of the data unit n. Additionally, the operation method may include determining that the transmission rate of the data unit n+1 is different from a transmission rate of the data unit n, based on the first indicator included in the frame n. Further, the operation method may include identifying one or more quiet time durations (QTDs) existing in the frame n+1. Still further, the operation method may include obtaining the data unit n+1 from a duration excluding the one or more QTDs in the frame n+1, and n may be a natural number.

The frame n may include a second indicator indicating a transmission rate of the data unit n+1. The first communication node may be configured to identify one or more quiet time durations (QTDs) existing in the frame n+1 based on the transmission rate indicated by the second indicator. The frame n may include a plurality of subframes. The first indicator and the second indicator may be included in a last subframe among the plurality of subframes. The last subframe may include a data field and an operation/administration/maintenance (OAM) field. The first indicator and the second indicator may be included in the OAM field. The frame n+1 may include a plurality of subframes. The one or more QTDs may exist with the plurality of subframes. The same number of the QTDs may be configured for each of the plurality of subframes. The transmission rate of the data unit n+1 may be determined based on the number of the QTDs.

In accordance with still another exemplary embodiment of the present disclosure, a first communication node may be configured as an Ethernet-based vehicle network. The communication node may include a processor and a memory storing at least one instruction executable by the processor. Additionally, the processor may be configured to generate a frame n including a data unit n, and a first indicator indicating that a size of a data unit n+1 to be transmitted via a frame n+1 after determining that the frame n is different from a size of the data unit n. Further, the processor may be configured to transmit the frame n to a second communication node and generate the frame n+1 including the data unit n+1. Still further, the processor may be configured to transmit the frame n+1 to the second communication node. A transmission rate of the data unit n may be different from the transmission rate of the data unit n+1, and n may be a natural number.

The frame n may include a second indicator indicating a transmission rate of the data unit n+1. The first communication node may be configured to transmit the frame n+1 to the second communication node at a transmission rate indicated by the second indicator. The frame n may include a plurality of subframes. The first indicator and the second indicator may be included in a last subframe among the plurality of subframes. The last subframe may include a data field and an operation/administration/maintenance (OAM) field. The first indicator and the second indicator may be included in the OAM field. The frame n+1 may include a plurality of subframes. The frame n+1 may include one or more quiet time durations (QTDs). During the QTDs, data transmission may be interrupted. The QTDs may be inserted with the plurality of subframes. The same number of the QTDs may be configured for each of the plurality of subframes. The transmission rate of the data unit n+1 may be determined based on the number of the QTDs.

According to the exemplary embodiments of the present disclosure, in the Ethernet-based vehicle network environment, an end node may be configured to transmit data by configuring a transmission rate differently based on the size of the data. Therefore, communication reliability between end nodes and the performance of the vehicle network may be improved. Additionally, the end node may be configured, in response to the end node changing the transmission rate of data, to not enter a separate mode such as the idle mode. As a result, a time delay may be prevented. Further, the end node may be configured to implement the transmission rate that corresponds to the size of the data. As a result, the energy required for data transmission may be reduced.

However, effects of the method and apparatus for data transmission and reception in the vehicle network according to the exemplary embodiments of the present disclosure are not limited to those mentioned above. Other effects not mentioned will be clearly understood by those skilled in the art from the following description.

BRIEF DESCRIPTION OF DRAWINGS

Exemplary embodiments of the present disclosure will become more apparent by describing in detail forms of the present disclosure with reference to the accompanying drawings, in which:

FIG. 8 is a diagram illustrating an exemplary embodiment of the frame n;

FIG. 11 is a diagram illustrating an exemplary embodiment of an operation, administration and maintenance (OAM) field included in the subframe n;

FIG. 18 is a diagram illustrating an exemplary embodiment of a control code including an identifier indicating asymmetric transmission in FIG. 17.

Figure 1:
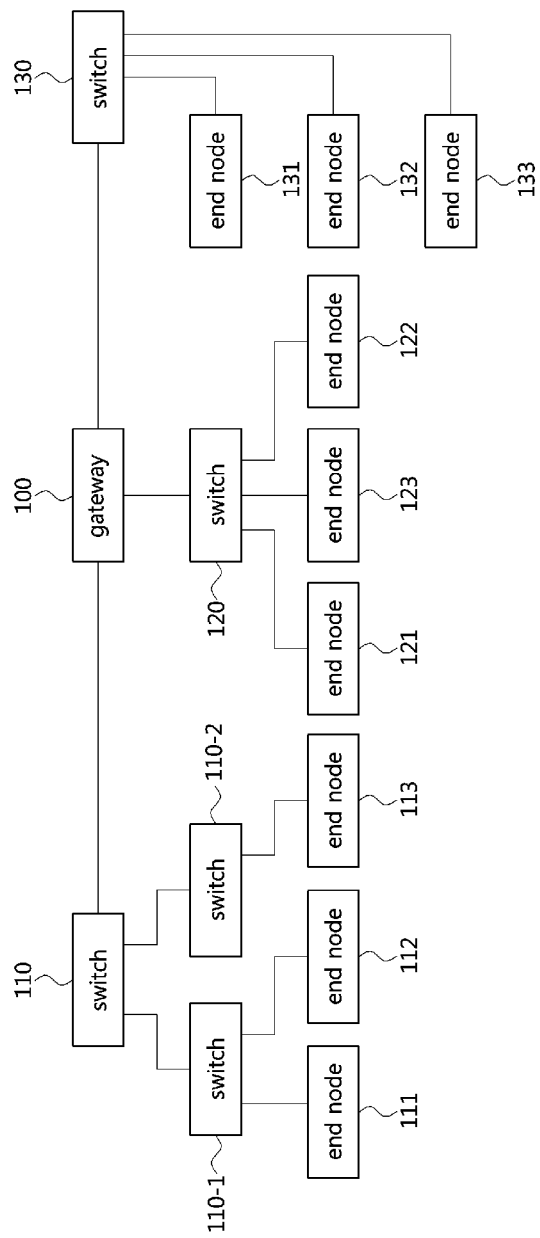
FIG. 1 is a block diagram illustrating a first exemplary embodiment of a vehicle network topology.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, exemplary embodiments of the present disclosure will be described in detail with reference to the accompanying drawings. As those skilled in the art would realize, the described exemplary embodiments may be modified in various different manners, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion powered vehicles, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/controller unit/control unit may perform one or more of the processes described further below, and the term controller/controller unit/control unit refers to a hardware device that includes a memory and a processor. The memory is configured to store the modules, and the processor is specifically configured to execute said modules to perform one or more processes. The one or more processes are described further below. Moreover, it is understood that the units or modules described herein may embody a controller/controller unit/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first exemplary embodiment of a vehicle network topology. As shown in FIG. 1, a communication node may be a vehicle network. The communication node may be a gateway, a switch (or bridge), or an end node. The gateway 100 may be connected with at least one switch 110, 110-1, 110-2, 120, and 130, and may be configured to connect different networks. For example, the gateway 100 may support connections with a switch. A first switch 110 may support a controller area network (CAN) (or, FlexRay, media oriented system transport (MOST), or local interconnect network (LIN)) network). A second switch 130 may support an Ethernet protocol. Each of the switches 110 and 130 may be connected to the gateway 100. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and operate at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to operate various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

The communication nodes (i.e., gateways, switches, end nodes, etc.) of the vehicle network may be connected in a star topology, a bus topology, a ring topology, a tree topology, a mesh topology, or the like. Further, each of the communication nodes of the vehicle network may support the CAN protocol, the FlexRay protocol, the MOST protocol, the LIN protocol, the Ethernet protocol, or the like. The exemplary embodiments according to the present disclosure may be applied to the network topology described above. The network topology may be variously configured without restriction to the above-described network topology.

Figure 2:
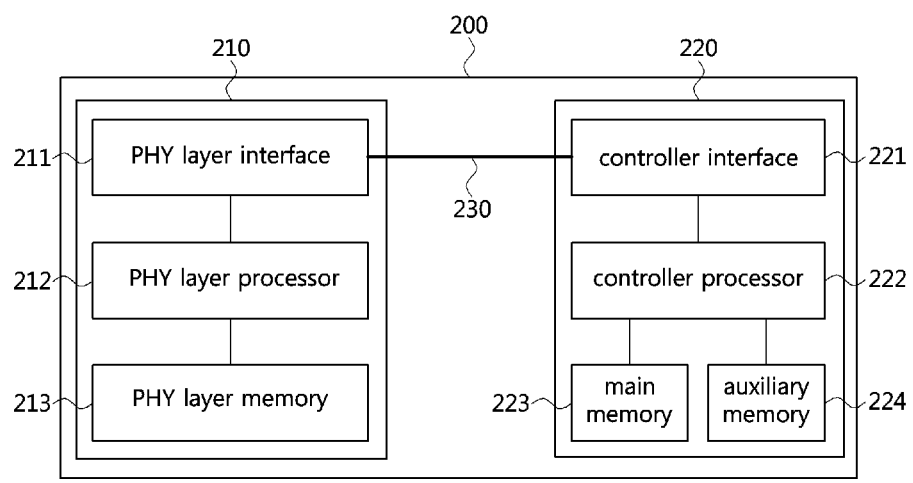
FIG. 2 is a block diagram illustrating a first exemplary embodiment of a communication node as part of a vehicle network.

FIG. 2 is a block diagram illustrating a first exemplary embodiment of a communication node as part of a vehicle network. As shown in FIG. 2, a communication node 200 may be a vehicle network. The communication node 200 may include a physical (PHY) layer 210 and a controller 220. The communication node 200 may further include a regulator (not shown) for supplying power. In particular, the controller 220 may be include a medium access control (MAC) layer. The PHY layer 210 may be configured to receive or transmit signals from or to another communication node. The controller 220 may be configured to operate the PHY layer 210 and perform various functions (e.g., an infotainment function, or the like.). The PHY layer 210 and the controller 220 may be configured as one system on chip (SoC), or alternatively may be configured as separate chips.

The PHY layer 210 and the controller 220 may be connected via a media independent interface (MII) 230. The MII 230 may include an interface defined in the Institute of Electrical and Electronics Engineers (IEEE) 802.3. The MII 230 may include a data interface and a management interface with the PHY layer 210 and the controller 220. One of a reduced MII (RMII), a gigabit MII (GMII), a reduced GMII (RGMII), a serial GMII (SGMII), and a 10 GMII (XGMII) may be used instead of the MII 230. The data interface may include a transmission channel and a reception channel. Each of the transmission channel and the reception channel may have independent clock, data, and control signals. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various manners. The PHY layer interface 211 may be configured to transmit a signal received from the controller 220 to the PHY layer processor 212 and transmit a signal received from the PHY layer processor 212 to the controller 220. The PHY layer processor 212 may be configured to operate the PHY layer interface 211 and the PHY layer memory 213. The PHY layer processor 212 may be configured to modulate a signal to be transmitted or demodulate a received signal. The PHY layer processor 212 may be configured to operate the PHY layer memory 213 to input or output a signal. The PHY layer memory 213 may be configured to store the received signal and output the stored signal based on a request from the PHY layer processor 212.

The controller 220 may be configured to monitor and operate the PHY layer 210 using the MII 230. The controller 220 may include a controller interface 221, a controller processor 222, a main memory 223, and an auxiliary memory 224. The controller processor 222 may be an electric circuit. The controller processor 222 may be configured to perform various functions described below.

The configuration of the controller 220 is not limited thereto, and the controller 220 may be configured in various manners. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for operating the controller interface 221, the main memory 223, and the auxiliary memory 224.

The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222. Each of the main memory 223 and the auxiliary memory 224 may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory. The non-volatile memory may store an operating system code (e.g., a kernel and a device driver) and an application program code for performing a function of the controller 220. A flash memory having a high processing speed, a hard disc drive (HDD), or a compact disc-read only memory (CD-ROM) for large capacity data storage may be used as the non-volatile memory. In some exemplary embodiments, the controller processor 222 may include a logic circuit having at least one processing core. A core of an Advanced RISC Machines (ARM) family or a core of an Atom family may be used as the controller processor 222.

Figure 3:
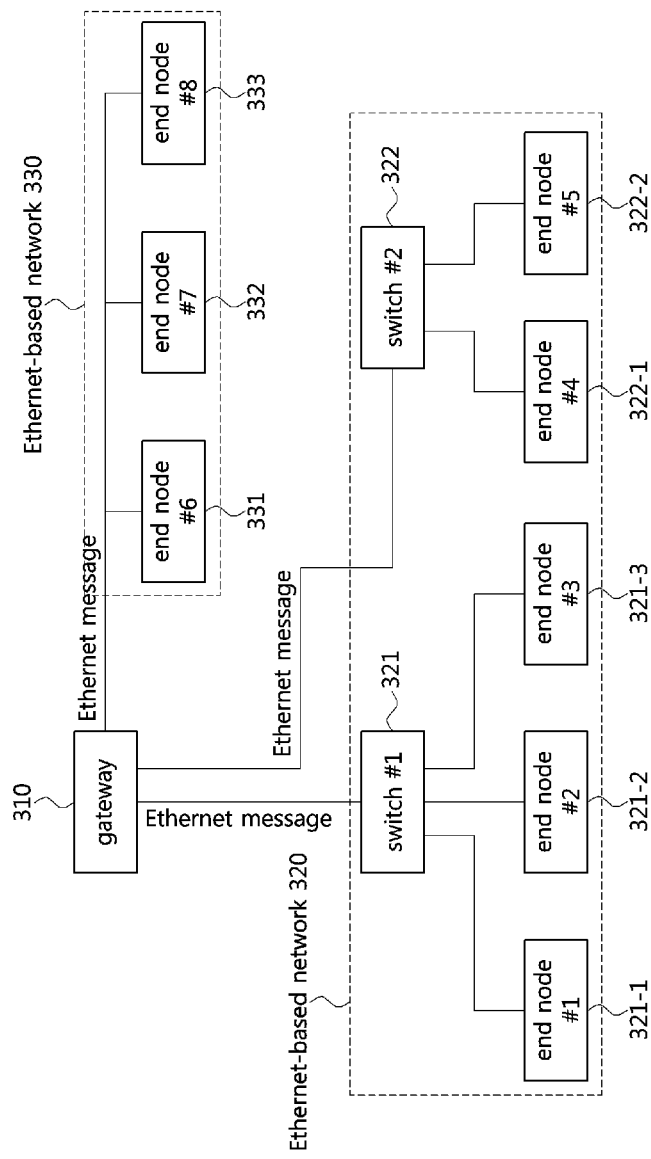
FIG. 3 is a block diagram illustrating a second exemplary embodiment of a vehicle network topology.
Figure 4:
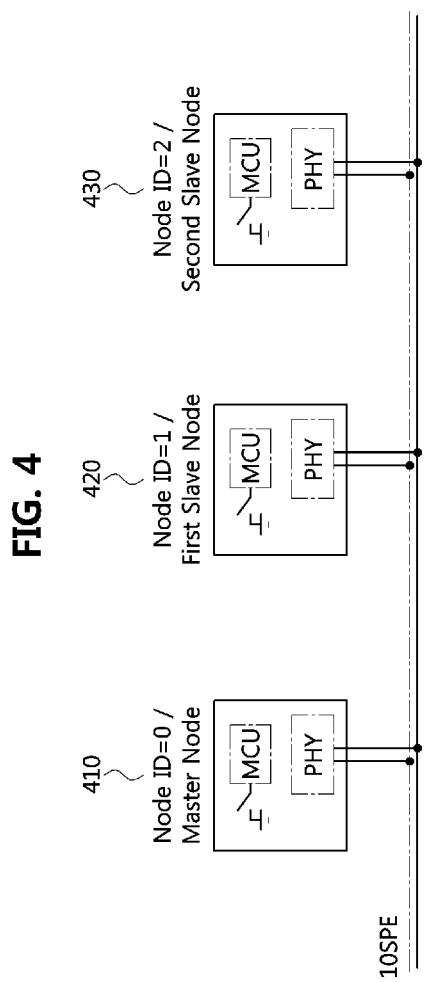
FIG. 4 is a block diagram illustrating an exemplary embodiment of a 10SPE network.

FIG. 3 is a block diagram illustrating a second exemplary embodiment of a vehicle network topology, and FIG. 4 is a block diagram illustrating an exemplary embodiment of a 10SPE network. As shown in FIG. 3, a vehicle network may include a plurality of Ethernet based networks 320 and 330. A gateway 310 as part of the vehicle network may support Ethernet-based network communication. The Ethernet-based networks 320 and 330 may include a switch #1 321, a switch #2 322, an end node #1 321-1, an end node #2 321-2, an end node #3 321-3, an end node #4 322-1, an end node #5 322-2, an end node #6 331, an end node #7 332, an end node #8 333, and the like. The end node #1 321-1, the end node #2 321-2, and the end node #3 321-3 may be connected to the switch #1 321, the end node #4 322-1 and the end node #5 322-2 may be connected to the switch #2 322, and the switch #1 321 and the switch #2 322 may be connected to the gateway 310.

One of the plurality of Ethernet based networks may be a 10 Mbps single pair Ethernet (10SPE) network 330. The end node #6 331, the end node #7 332, and the end node #8 333 may be connected to the gateway 310 via a bus or a single pair of wires. The end node #6 331, the end node #7 332, and the end node #8 333 may be connected by a 10SPE network scheme.

Messages based on the Ethernet protocol may be referred to as "Ethernet messages", and the Ethernet messages may be referred to also as "Ethernet frames", "Ethernet signals", "Ethernet packets", or the like. The end nodes 321-1, 321-2, 321-3, 322-1, 322-2, 331, 332, and 333 may communicate using Ethernet messages. The end nodes 321-1, 321-2, 321-3, 322-1, 322-2, 331, 332, and 333 may be part of the Ethernet-based network. Communication with the Ethernet-based networks 320 and 330 and the gateway 310 may also be performed using Ethernet messages.

As shown in FIG. 4, the end nodes of the 10 SPE network may be configured with a master-slave relationship. For example, one end node 410 of the end nodes of the vehicle network may be a master node, and the remaining nodes 420 and 430 except the master node 410 may be slave nodes. The master node 410 and slave nodes 420 and 430 may operate in a sleep state, and in response to receiving a local wake-up signal or a remote wake-up signal, an operation state of each of the master node 410 and the slave nodes 420 and 430 may transition from the sleep state to a wake-up state.

The master node 410 and the slave nodes 420 and 430 of the 10 SPE network may refer to electronic control units (ECUs) operating various devices included in the vehicle. Each of the end nodes of the vehicle network may be configured to support the Ethernet protocol.

The master node 410 and slave nodes 420 and 430 may be connected in a bus topology. The master node 410 and the slave nodes 420 and 430 may be connected in a power over data lines (PoDL) scheme via a pair of wires. The pair of wires may be wires for supply power to the end node or transferring data packets with the end nodes.

The master node 410 among the end nodes of the 10 SPE network may be configured to supply a signal and power to wake up the other slave nodes 420 and 430 via a pair of wires. Then, the master node 410 may be configured to communicate with the slave nodes 420 and 430 via a pair of wires. The slave nodes 420 and 430 may be configured to receive the signal from the master node 410 via a pair of wires, and may transmit and receive data packets with other nodes via a pair of wires.

In response to a signal to simultaneously transmit data packets from a plurality of end nodes connected to the 10SPE network to other end nodes, collisions with different data packets may occur in the PHY layer. A plurality of end nodes connected to the 10SPE network may be configured to use a PHY layer collision avoidance (PLCA) function to avoid collision in the PHY layer. In other words, the PLCA function may be a function of sequentially granting a transmission opportunity for transmitting a data packet to a plurality of end nodes connected to the 10SPE network.

Figure 5:
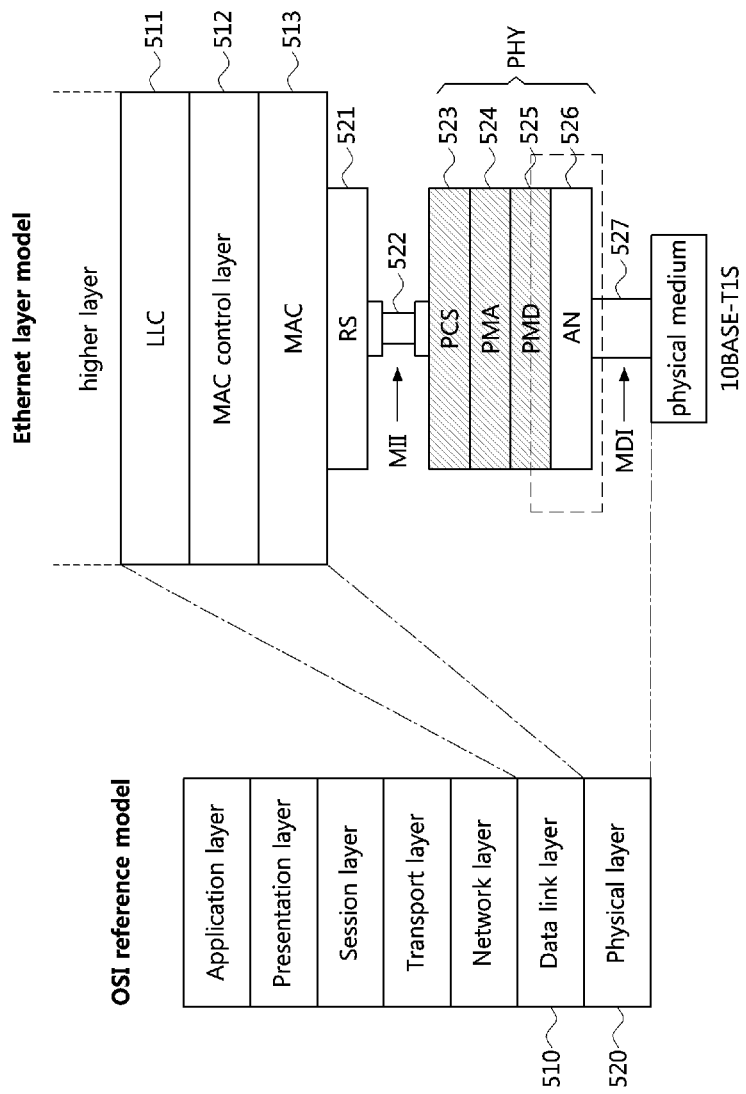
FIG. 5 is a diagram illustrating an exemplary embodiment of an Ethernet layer model.

FIG. 5 is a diagram illustrating an Ethernet layer model. As shown in FIG. 5, an Ethernet layer model may include a MAC layer and a PHY layer. The MAC layer of the Ethernet layer model may correspond to a data link layer 510 of the open systems interconnection (OSI) reference model, and may include a logical link control (LLC) or other MAC client sublayer 511, a MAC control sublayer 512, and a MAC sublayer 513.

The MAC layer of the Ethernet layer model may be connected to the PHY layer via a reconciliation sublayer (RS) 521 and an MII sublayer 522. The RS 521 and the MII sublayer 522 of the Ethernet layer model may correspond to a PHY layer 520 of the OSI reference model. The RS 521 may be configured to perform a function of adjusting logical signal mapping with the MAC sublayer 513 and a PCS 523 to be described later.

The RS 521 may be a sublayer supporting the PCLA function with the MAC layer and the PHY layer connected via the MII sublayer 522. The RS 521 may be configured to adjust mapping of signals with the MAC sublayer and the PCS 523 during a predetermined time slot to prevent collision in the PHY layer due to transmission of frames.

The PHY layer of the Ethernet layer model may correspond to a PHY layer 520 of the OSI reference model, and may include a physical coding sublayer (PCS) 523, a physical media attachment (PMA) sublayer 524, and a physical medium dependent (PMD) sublayer 525, and an auto-negotiation (AN) sublayer 526.

The PCS 523 may be configured to obtain data from the MAC layer, and perform line coding on the data based on a protocol of the network (e.g., a transmission speed, etc.). The PCS 523 may be configured to transfer the data generated as a result of the line encoding to the PMA sublayer 524.

The PMA sublayer 524 may be configured to obtain the data generated as a result of the line encoding from the PCS 523, and convert the obtained data into a physical signal. The PMA sublayer 524 may be configured to transfer the data converted into the physical signal to the PMD sublayer 525. The PMD sublayer 525 may be configured to obtain the data converted into the physical signal from the PMA sublayer 524, and convert the obtained physical signal to be suitable for a physical medium connected to the PHY layer.

The AN sublayer 526 may be a sublayer that configures an optimal transmission scheme between with end nodes transmitting signals among a plurality of transmission schemes. The AN sublayer 526 may be configured to determine one signal transmission scheme by performing negotiation with other end nodes based on a plurality of signal transmission schemes. In addition, the AN sublayer 526 may be configured to determine master-slave relationship of the plurality of end nodes. For example, in response to receiving a signal from another end node, the AN sublayer 526 may be configured to determine whether the end node transmitting the signal is a master node or a slave node.

The PHY layer of the Ethernet layer model may be connected to a physical medium via a medium dependent interface (MDI) 527. The MDI 527 may be configured to receive the physical signal from the PMD sublayer 525 and transmit the signal via the physical medium. The MDI 527 of the Ethernet layer model may correspond to the PHY layer 520 of the OSI reference model.

Hereinafter, a method performed at an end node as part of a vehicle network and a method performed at a corresponding counterpart end node will be described. Descriptions of a method (e.g., transmission or reception of a signal) to be performed at a first end node are not limited. In other words, a corresponding second end node may perform a method (e.g., reception or transmission of the signal) that corresponds to the method performed at the first end node. Additionally, in response to an operation of the first end node, the corresponding second end node may be configured to perform an operation that corresponds to the operation of the first end node. Conversely, in response to an operation of the second end node, the corresponding first end node may be configured to perform an operation that corresponds to the operation of the second end node. In particular, each of a plurality of end nodes may be configured to perform the following operations with at least one instruction stored in the memory. The methods described hereinbelow may be executed by a processor or a controller.

Figure 6:
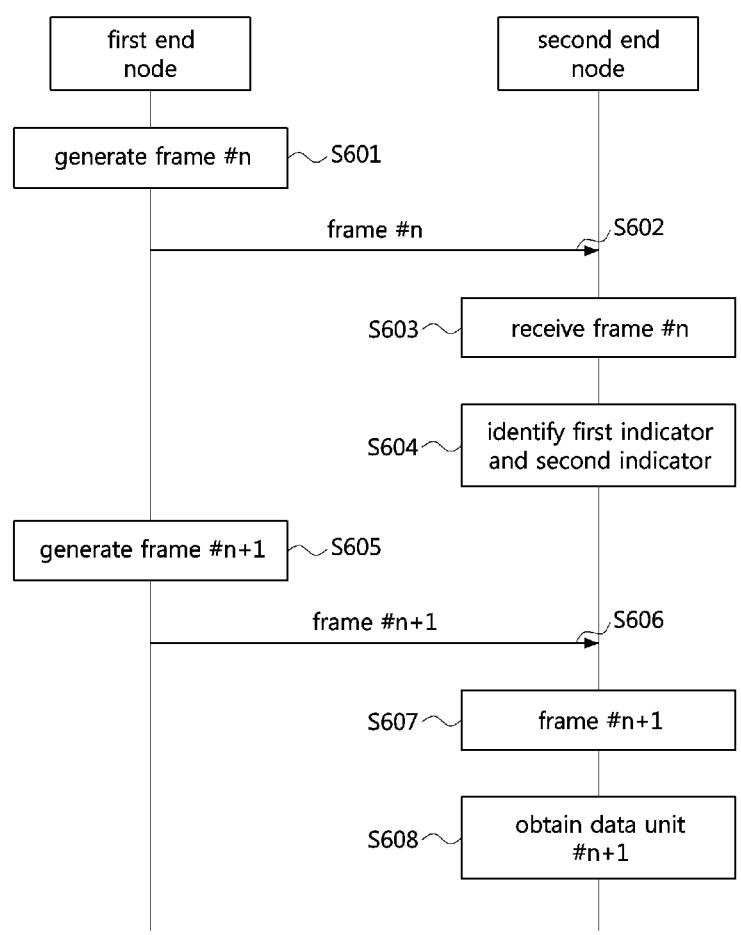
FIG. 6 is a sequence chart illustrating an exemplary embodiment of an operation method of an end node, which is performed in a vehicle network.

FIG. 6 is a sequence chart illustrating an operation method of an end node. The operation method may be performed in a vehicle network. An end node may configured to transmit data at different rates based on the size of the data (i.e., asymmetric transmission scheme), in addition to a symmetric transmission (or normal mode transmission) scheme. With the symmetric transmission (or normal mode transmission) scheme, the end node may transmit the data at a constant rate regardless of the size of the data.

Figure 7A:
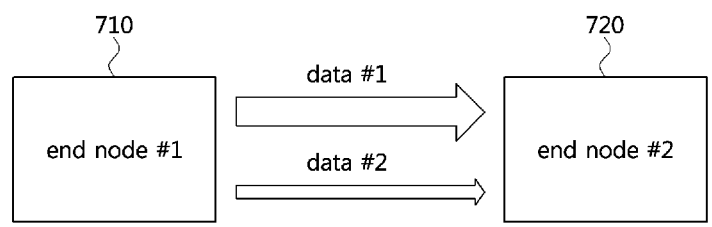
FIGS. 7A and 7B are diagrams illustrating an exemplary embodiment of an asymmetric transmission scheme.
Figure 7B:
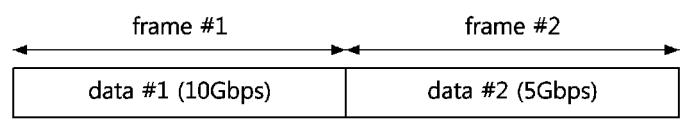

FIGS. 7A and 7B are diagrams illustrating an asymmetric transmission scheme. As shown in FIGS. 7A and 7B, a first end node may be configured to transmit data to a second end node with an asymmetric transmission scheme. In detail, the first end node may be configured to transmit data #1 to the second end node at a rate of about 10 giga bits per second (Gbps). The data #1 may be data requiring high speed transmission, and may be data having a relatively large size. For example, the data #1 may be audio and video (AV) data of a camera or a display.

Conversely, the first end node may be configured to transmit data #2 to the second end node at a rate of about 5 Gbps. The data #2 may be data requiring slow speed transmission, and may be data having a relatively small size. For example, the data #2 may be control data. Accordingly, the first end node may be configured to transmit data in the asymmetric transmission scheme. With the asymmetric transmission scheme, each data may be transmitted at a different rate based on the size of each data. Therefore, the loss of power (energy) used for transmission of the data may be minimized.

Referring back to FIG. 6, the first end node transmitting data may be configured to generate a frame n (S601). More specifically, the first end node may be configured to generate a data unit n including actual information, and a first indicator indicating whether a size of a data unit n+1 to be transmitted via a frame n+1 after determining that the frame n is different from a size of the data unit n. In response to an indication of the first indicator that the size of the data unit n is different from the size of the data unit n+1, the first end node may be configured to further generate a second indicator indicating the transmission rate of the data unit n+1. In particular, n may be a natural number.

In response to an indication of the first indicator that the size of the data unit n is different from the size of the data unit n+1, the first end node may be configured to generate the frame n including the first indicator and the second indicator. In response to an indication of the first indicator that the size of the data unit n and the size of the data unit n+1 are not different, the first end node may be configured to generate the frame n including the first indicator. The structure of the frame n will be described in detail with reference to FIGS. 8 to 12, inclusive.

Figure 9:
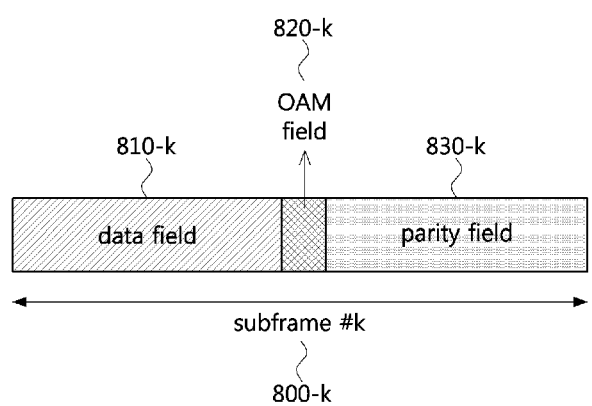
FIG. 9 is a diagram illustrating an exemplary embodiment of a subframe #k included in the frame n.
Figure 10:
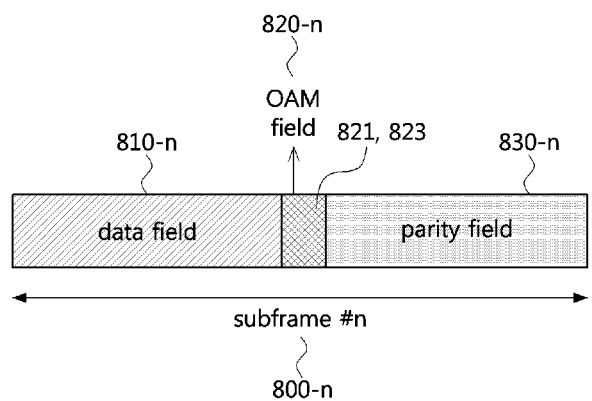
FIG. 10 is a diagram illustrating a first exemplary embodiment of a subframe n included in the frame n.
Figure 12:
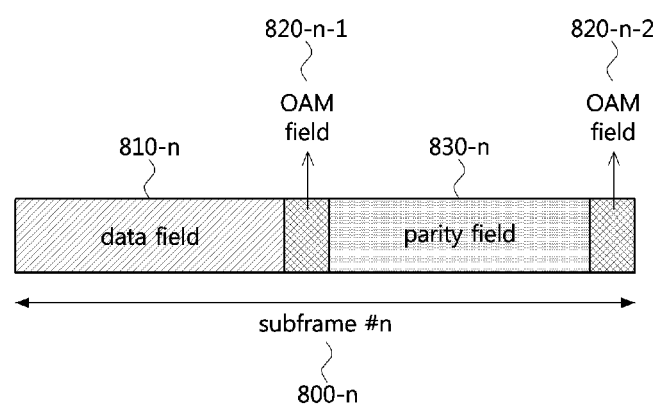
FIG. 12 is a diagram illustrating a second exemplary embodiment of the subframe n included in the frame n.

FIG. 8 is a diagram illustrating the frame n, FIG. 9 is a diagram illustrating a subframe k included in the frame n, FIG. 10 is a diagram illustrating a first exemplary embodiment of a subframe n included in the frame n, FIG. 11 is a diagram illustrating an operation, administration and maintenance (OAM) field included in the subframe n, and FIG. 12 is a diagram illustrating a second exemplary embodiment of the subframe n included in the frame n. As shown in FIG. 8, the frame n 800 may be a frame transmitted in a physical coding sublayer (PCS). The frame n 800 may include a plurality of subframes 800-1, 800-2, . . . , 800-k, . . . , and 800-n. In an exemplary embodiment, each subframe may be a Reed Solomon forward error correction (RS-FEC) frame. Additionally, the data unit n included in the frame n may be a collection of data segments existing in the plurality of sub-frames (800-1, 800-2, . . . , 800-k, . . . , and 800-n) included in the frame n.

As shown in FIG. 9, in the plurality of subframes 800-1, 800-2, . . . , 800-k, . . . , and 800-n, the subframe k may include a data field 810-k including actual information, an OAM field 820-k for providing an OAM function, and a parity field 830-k for performing error detection. The data field 810-k may consist of 50 blocks, and may have 3250 bits. The OAM field 820-k may have 10 bits, and the parity field 830-k may have 340 bits. Accordingly, the subframe k 800-k may have 3600 bits.

As shown in FIG. 10, the subframe n 800-n may be the last subframe among the plurality of subframes 800-1, 800-2, . . . , 800-k, . . . , and 800-n. The subframe n 800-n may include the first indicator indicating whether the size of the data unit n+1 to be transmitted via the frame n+1 after determining that the frame n is different from the size of the data unit n. In response to an indication of the first indicator that the size of the data unit n is different from the size of the data unit n+1, the subframe n 800-n may further include the second indicator indicating the transmission rate of the data unit n+1. More specifically, the OAM field 820-n included in the subframe n 800-n may include the first indicator 821 and the second indicator 823, or may include the first indicator 821.

As shown in FIG. 11, a bit D9 included in a symbol 0 of the OAM field 820-n may be configured as the first indicator 821. The D9 bit may be used as the first indicator 821 indicating whether the size of the data unit is changed. The D9 bit used as the first indicator 821 may be 0 or 1. When the D9 bit is set to 1, the D9 bit may indicate that the size of the data unit n+1 to be transmitted via the frame n+1 after determining that the frame n is different from the size of the data unit n. In contrast, when the D9 bit is set to 0, the D9 bit may indicate that the size of the data unit n+1 to be transmitted via the frame n+1 after determining the frame n is not different from the size of the data unit n. Additionally, the first end node may be configured to identify a change of the size of data to be transmitted to the second end node by monitoring the amount of a buffer present in the MII.

Bits D5 and D4 included in the symbol 0 of the OAM field 820-n may be configured as the second indicator 823. The bits D5 and D4 may be used as the second indicator indicating the transmission rate of the data unit n+1. The bits D5 and D4 may be (0, 0), (0, 1), (1, 0), or (1, 1). The first end node may be configured to indicate different data transmission rates via the bits D5 and D4. As an example, in response to setting the bits D5 and D4 to (0, 1), the first end node may be configured to indicate a rate of about 2.5 Gbps. When the bits D5 and D4 are set to (1, 0), the first end node may be configured to indicate a rate of about 5 Gbps. When the bits D5 and D4 are set to (1, 1), the first end node may be configured to indicate a rate of about 10 Gbps. When the bits D5 and D4 are set to (0, 0), the first end node may be configured to indicate a rate other than about 2.5 Gbps, about 5 Gbps, and about 10 Gbps As shown in FIG. 12, the last subframe among the plurality of subframes 800-1, 800-2, . . . , 800-k, . . . , and 800-*n* included in the subframe n 800-*n* may include two OAM fields 820-*n*. In particular, the first indicator 821 may be included in the first OAM field 820-*n*-1, and the second indicator 823 may be included in the second OAM field 820-*n*-2.

Referring back to FIG. 6, the first end node may be configured to transmit the frame n to the second end node (S602). S602 will be described in detail with reference to FIGS. 13 and 14.

Figure 13:
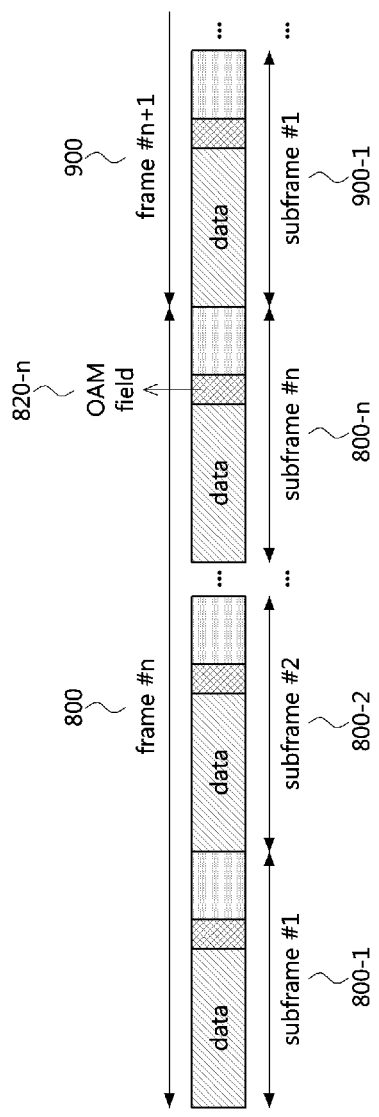
FIG. 13 is a diagram illustrating a first exemplary embodiment of an end node transmitting the frame n+1.
Figure 14:
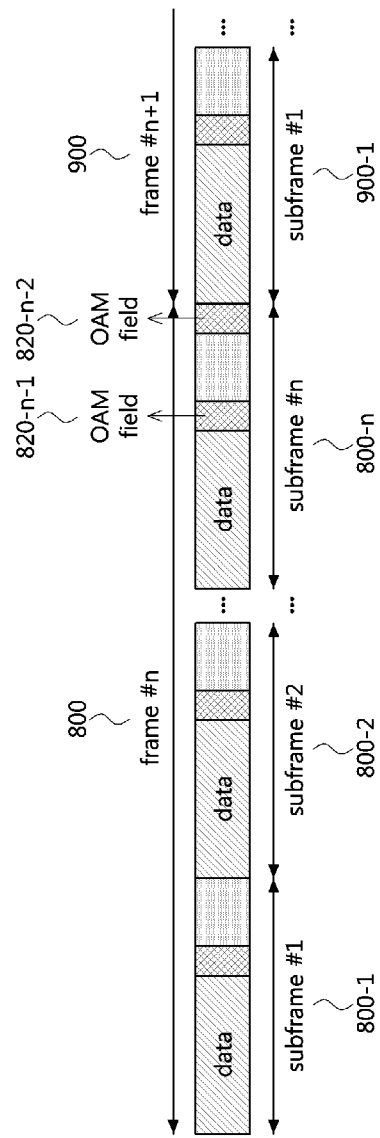
FIG. 14 is a diagram illustrating a second exemplary embodiment of an end node transmitting the frame n+1.

FIG. 13 is a diagram illustrating a first exemplary embodiment of an end node transmitting the frame n+1, and FIG. 14 is a diagram illustrating a second exemplary embodiment of an end node transmitting the frame n+1. As shown in FIG. 13, the first end node may be configured to identify whether the size of the data unit n+1 included in the frame n+1 900 to be transmitted to the second end node after determining that the frame n 800 is equal to the size of the data unit n. In response to a determination that the size of the data unit n+1 included in the frame n+1 900 to be transmitted to the second end node after determining that the frame n 800 is different from the size of the data unit n, the first end node may be configured to transmit the frame n 800 to the second end node, the frame n 800 including the first indicator indicating that the size of the data unit n+1 included in the frame n+1 900 after determining that the frame n 800 is different from the size of the data unit n and the second indicator indicating the transmission rate of the data unit n+1. In other words, the first end node may be configured to transmit, to the second end node, the frame n including the subframe n 800-*n* including the OAM field including the first indicator and the second indicator.

Conversely, when the size of data unit n+1 included in the frame n+1 900 to be transmitted to the second end node after determining that the frame n 800 is not different from the size of the data unit n, the first end node may be configured to transmit, to the second end node, the frame n 800 including the first indicator indicating that the size of data unit n+1 included in the frame n+1 900 after determining that the frame n 800 is not different from the size of the data unit n. In other words, the first end node may be configured to transmit the frame n including the subframe n 800-*n* including the OAM field including the first indicator to the second end node.

As shown in FIG. 14, the first end node may be configured to identify whether the size of the data unit n+1 included in the frame n+1 900 to be transmitted to the second end node after determining that the frame n 800 is equal to the size of the data unit n. In response to a determination that the size of the data unit n+1 included in the frame n+1 900 to be transmitted to the second end node after determining that the frame n 800 is different from the size of the data unit n, the first end node may be configured to transmit the frame n 800 to the second end node, the frame n 800 including the first indicator indicating that the size of the data unit n+1 included in the frame n+1 900 after determining that the frame n 800 is different from the size of the data unit n and the second indicator indicating the transmission rate of the data unit n+1.

In other words, the first end node may be configured to transmit, to the second end node, the frame n including the subframe n 800-*n* including the OAM field 820-*n*-1 including the first indicator and the OAM field 820-*n*-2 including the second indicator. Conversely, when the size of data unit n+1 included in the frame n+1 900 to be transmitted to the second end node after determining that the frame n 800 is not different from the size of the data unit n, the first end node may be configured to transmit the frame n 800 to the second end node in the same manner as the operation of the first end node described with reference to FIG. 13.

Referring back to FIG. 6, the second end node may be configured to receive the frame n (S603). More specifically, the second end node may be configured to receive the frame n including the data unit n, the first indicator indicating that the size of the data unit n+1 included in the frame n+1 900 to be transmitted to the second end node after determining that the frame n 800 is different from the size of the data unit n, and the second indicator indicating the transmission rate of the data unit n+1 in response to an indication of the first indicator that the sizes of the data units are different.

The second end node may be configured to identify the first indicator included in the frame n (S604). The second end node may be configured to determine whether the transmission rate of the data unit n+1 is different from the transmission rate of the data unit n based on the first indicator included in the frame n. The second end node may be configured to further identify the second indicator when the first indicator included in the frame n indicates that the size of data unit n+1 to be transmitted via the frame n+1 after determining that the frame n is different from the size of the data unit n.

The first end node may be configured to generate the frame n+1 including the data unit n+1 based on the first indicator and the second indicator (S605). The first end node may be configured to insert quiet time durations (QTDs). During QTDs, data transmission may be stopped with the plurality of subframes of the frame n+1 based on the second indicator. The first end node may be configured to adjust the transmission rate of the data n+1 by configuring one or more QTDs with the plurality of subframes. The greater the number of QTDs configured with the plurality of subframes, the lower the data transmission rate. The first end node may configure the same number of QTDs with the plurality of subframes.

Figure 15:
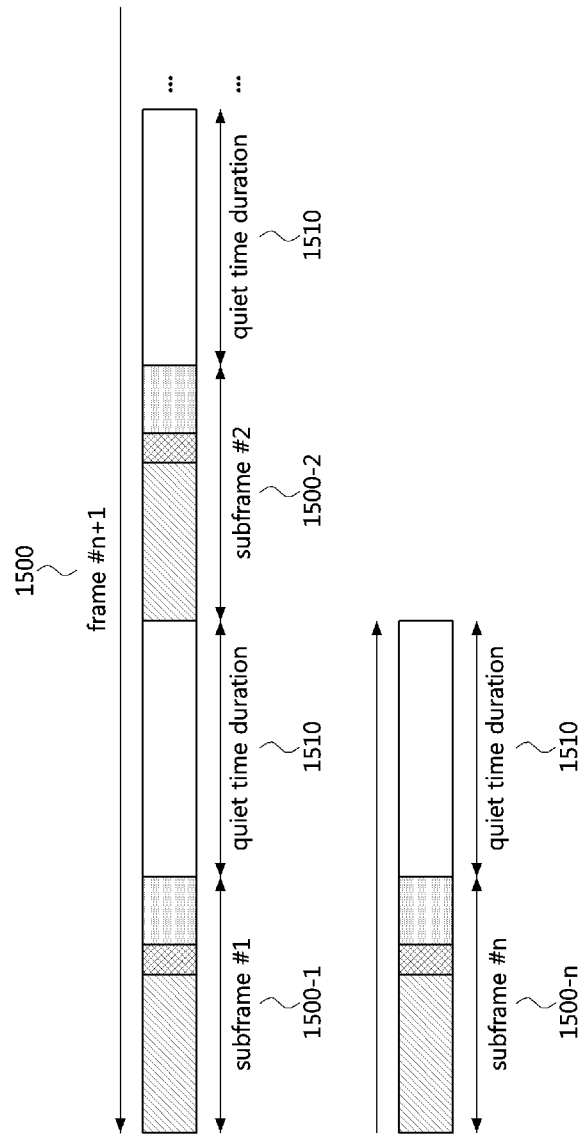
FIG. 15 is a diagram illustrating a first exemplary embodiment of the frame n+1.
Figure 16:
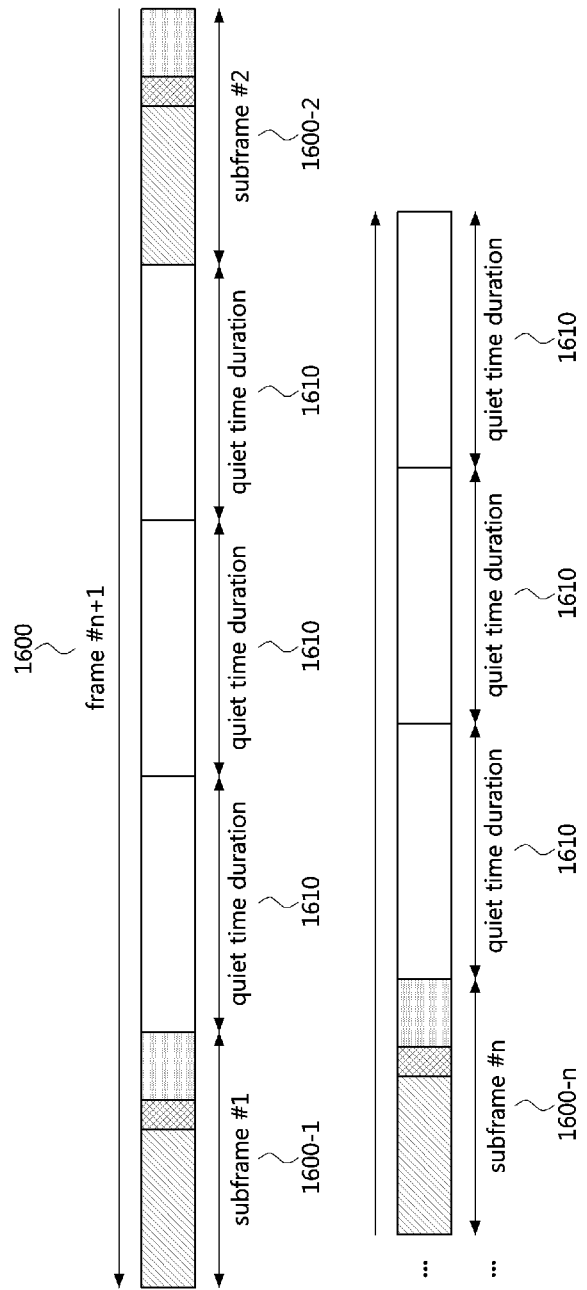
FIG. 16 is a diagram illustrating a second exemplary embodiment of the frame n+1.

FIG. 15 is a diagram illustrating a first exemplary embodiment of the frame n+1, and FIG. 16 is a diagram illustrating a second exemplary embodiment of the frame n+1. As shown in FIG. 15, the first end node may include one QTD 1510 in each interval with a plurality of subframes 1500-1, 1500-2, . . . , and 1500-*n* included in the frame n+1 1500. In other words, the first end node may configure one QTD 1510 every time one data segment is transmitted. In particular, the first end node may be configured to transmit the data at a transmission rate of ½ as compared with the case where the QTD 1510 is not configured.

As shown in FIG. 16, the first end node may include three QTDs 1610 in each interval with a plurality of subframes 1600-1, 1600-2, . . . , and 1600-*n* included in the frame n+1 1600. In other words, the first end node may configure three QTDs 1610 every time one data segment is transmitted. In particular, the first end node may be configured to transmit the data at a transmission rate of ¼ as compared with the case where the QTDs 1610 are not configured. FIGS. 15 and 16 illustrate that the number of QTDs inserted into the frame n+1 is one or three, but exemplary embodiments of the present disclosure are not limited thereto, and a various number of QTDs may be inserted based on transmission requirements and data size.

Additionally, the length of the QTD may be set to the same length as the length of any one of the plurality of subframes, and the plurality of subframes 1500-1, 1500-2, . . . , 1500-*n*, 1600-1, 1600-2, . . . , and 1600-*n* may be subframes. Pulse-amplitude modulation (PAM) may be performed on the frames. Referring back to FIG. 6, the first end node may be configured to transmit the frame n+1 to the second end node at the transmission rate indicated by the second indicator (S606).

Figure 17:
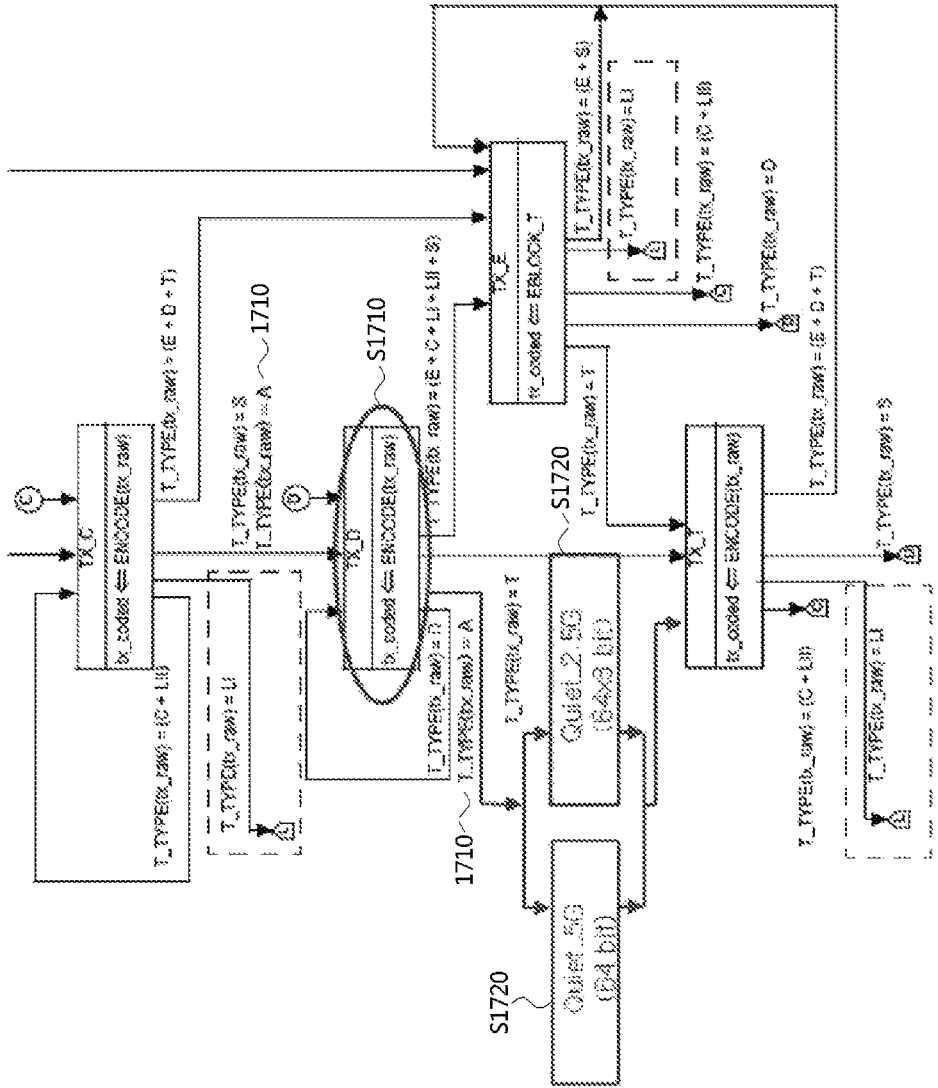
FIG. 17 is a diagram illustrating in detail an exemplary embodiment of an operation method of an end node that corresponds to S606 of FIG. 6.

FIG. 17 is a diagram illustrating in detail an operation method of an end node that corresponds to S606 of FIG. 6, and FIG. 18 is a diagram illustrating a control code including an identifier indicating asymmetric transmission in FIG. 17. As shown in FIGS. 17 and 18, in a process of transmitting the frame n (S1710), the first end node may be configured to identify an identifier 1710 (T_TYPE (tx_raw)=A (i.e., asymmetric transmission)) indicating asymmetric transmission or asymmetric operation 1810. A notation "/A/" may correspond with the asymmetric transmission or asymmetric operation 1810. The identifier indicating asymmetric transmission may be the first indicator indicating that the size of the data unit to be transmitted is different. The identifier indicating the asymmetric transmission may be included in a reserved field of a control code encoded and transmitted in a control block. The first end node may be configured to identify the identifier indicating the asymmetric transmission and insert one or more QTDs in the frame n+1 based on the transmission rate. Then, the first end node may be configured to transmit the frame n+1 (S1720).

For example, the first end node may configure one QTD (e.g., 64 bits) to be disposed with the plurality of subframes, and transmit the frame n+1 at about 5 Gbps. Alternatively, the first end node may configure three QTDs (e.g., 192 bits (64 bits×3)) to be disposed with the plurality of subframes, and transmit the frame n+1 at about 5 Gbps. Conversely, in response to a determination of no change in the size of data to be transmitted to the second end node, the first end node may be configured to transmit the data in a normal data mode that does not insert the QTD.

Referring back to FIG. 6, the second end node may be configured to receive the frame n+1 from the first end node (S607). Based on the transmission rate indicated by the second indicator identified in S604, the second end node may be configured to identify the length and number of QTDs existing in the frame n+1, the length of the frame n+1 excluding the QTDs, the number of subframes containing data, and the like.

The second end node may be configured to obtain the data unit n+1 present in the frame n+1 received from the first end node (S608). In detail, the second end node may be configured to identify the plurality of subframes included in the frame n+1 excluding the QTDs in the frame n+1. The second end node may be configured to obtain the data unit n+1 by combining the data segments existing in the plurality of subframes, except the QTDs with the plurality of subframes. Additionally, the second end node may be configured to perform demodulation operations on the frame n+1 based on the length and the number of the QTDs.

The methods according to exemplary embodiments of the present disclosure may be implemented as program instructions executable by a variety of computers and recorded on a non-transitory computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software. Examples of the non-transitory computer readable medium may include a hardware device such as ROM, RAM, and flash memory. The non-transitory computer readable medium may be specifically configured to store and execute the program instructions. Examples of the program instructions include machine codes made by, for example, a compiler, as well as high-level language codes executable by a computer, using an interpreter. The above exemplary hardware device may be configured to operate as at least one software module in order to perform the operation of the present disclosure, and vice versa.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. An operation method of a first communication node for asymmetric transmission in an Ethernet-based vehicle network, comprising:
   generating, by a controller, a frame n including a data unit n, and a first indicator indicating that a second size of a data unit n+1 to be transmitted via a frame n+1 after the frame n is different from a first size of the data unit n;
   transmitting, by the controller, the frame n to a second communication node;
   generating, by the controller, the frame n+1 including the data unit n+1; and
   transmitting, by the controller, the frame n+1 to the second communication node,
   wherein the data unit n has a first transmission rate, the data unit n+1 has a second transmission rate, and n is a natural number,
   wherein the first transmission rate is greater than the second transmission rate when the first size is smaller than the size, or the first transmission rate is smaller than the second transmission rate when the first size is greater than the second size,
   wherein the frame n includes a second indicator indicating a transmission rate of the data unit n+1, and the first communication node is configured to transmit the frame n+1 to the second communication node at a transmission rate indicated by the second indicator,
   wherein the frame n includes a plurality of subframes, and the first indicator and the second indicator are included in a last subframe among the plurality of subframes, and
   wherein the last subframe includes a data field and an operation/administration/maintenance (OAM) field and the first indicator and the second indicator are included in the OAM field.

2. The operation method according to claim 1, wherein the frame n+1 includes a plurality of subframes, and one or more quiet time durations (QTDs) are inserted with the plurality of subframes, and wherein data transmission is interrupted during the QTDs.

3. The operation method according to claim 2, wherein a length of the QTD is identical to a length of one subframe of the plurality of subframes.

4. The operation method according to claim 2, wherein a same number of the QTDs are configured for each of the plurality of subframes, and the second transmission rate of the data unit n+1 is determined based on the number of the QTDs.

5. An operation method of a first communication node for asymmetric transmission in an Ethernet-based vehicle network, comprising:
- receiving, by a controller, a frame n from a second communication node, the frame n including a data unit n, and a first indicator indicating that a second size of a data unit n+1 to be transmitted via a frame n+1 after the frame n is different from a first size of the data unit n;
- determining, by the controller, that a second transmission rate of the data unit n+1 is different from a first transmission rate of the data unit n, based on the first indicator included in the frame n;
- identifying, by the controller, one or more quiet time durations (QTDs) existing in the frame n+1; and
- obtaining, by the controller, the data unit n+1 from a duration excluding the one or more QTDs in the frame n+1,
- wherein the data unit n has a first transmission rate, the data unit n+1 has a second transmission rate, and n is a natural number,
- wherein the first transmission rate is greater than the second transmission rate when the first size is smaller than the size, or the first transmission rate is smaller than the second transmission rate when the first size is greater than the second size,
- wherein the frame n includes a second indicator indicating a transmission rate of the data unit n+1, and the first communication node is configured to identify one or more quiet time durations (QTDs) existing in the frame n+1 based on the transmission rate indicated by the second indicator,
- wherein the frame n includes a plurality of subframes, and the first indicator and the second indicator are included in a last subframe among the plurality of subframes, and
- wherein the last subframe includes a data field and an operation/administration/maintenance (OAM) field and the first indicator and the second indicator are included in the OAM field.

6. The operation method according to claim 5, wherein the frame n+1 includes a plurality of subframes, and the one or more QTDs exist with the plurality of subframes.

7. The operation method according to claim 6, wherein a same number of the QTDs are configured for each of the plurality of subframes, and the second transmission rate of the data unit n+1 is determined based on the number of the QTDs.

8. A first communication node for asymmetric transmission, constituting an Ethernet-based vehicle network, comprising a processor and a memory storing at least one instruction executable by the processor, wherein the processor is configured to:
- generate, by the processor, a frame n including a data unit n, and a first indicator indicating that a second size of a data unit n+1 to be transmitted via a frame n+1 after the frame n is different from a first size of the data unit n;
- transmit, by the processor, the frame n to a second communication node;
- generate, by the processor, the frame n+1 including the data unit n+1; and
- transmit, by the processor, the frame n+1 to the second communication node,
- wherein the data unit n has a first transmission rate, the data unit n+1 has a second transmission rate, and n is a natural number,
- wherein the first transmission rate is greater than the second transmission rate when the first size is smaller than the size, or the first transmission rate is smaller than the second transmission rate when the first size is greater than the second size,
- wherein the frame n includes a second indicator indicating a second transmission rate, and the first communication node transmits the frame n+1 to the second communication node at the second transmission rate indicated by the second indicator,
- wherein the frame n includes a plurality of subframes, and the first indicator and the second indicator are included in a last subframe among the plurality of subframes, and
- wherein the last subframe includes a data field and an operation/administration/maintenance (OAM) field and the first indicator and the second indicator are included in the OAM field.

9. The first communication node according to claim 8, wherein the frame n+1 includes a plurality of subframes, and one or more quiet time durations (QTDs) are inserted with the plurality of subframes, and wherein data transmission is interrupted during the QTDs.

10. The first communication node according to claim 9, wherein a same number of the QTDs are configured for each of the plurality of subframes, and the second transmission rate of the data unit n+1 is determined based on the number of the QTDs.

* * * * *